US 6,561,077 B2

(12) United States Patent
Castel et al.

(10) Patent No.: US 6,561,077 B2
(45) Date of Patent: May 13, 2003

(54) SYSTEM AND PROCESS FOR ASSEMBLING A TUBE IN A CONNECTING ELEMENT, AND SERVOMOTOR HOUSING INCLUDING SUCH A SYSTEM

(75) Inventors: Philippe Georges Castel, Paris (FR); Michael William Fanelli, Centerville, OH (US); Daniel Lordier, Deuil La Barre (FR); Michel Jean Vermoesen, Pittsfield, MA (US)

(73) Assignee: Delphi Technologies, Inc., Troy, MI (US)

( * ) Notice: Subject to any disclaimer, the term of this patent is extended or adjusted under 35 U.S.C. 154(b) by 55 days.

(21) Appl. No.: 09/829,428

(22) Filed: Apr. 9, 2001

(65) Prior Publication Data

US 2002/0144594 A1 Oct. 10, 2002

(51) Int. Cl.[7] .......................... F01B 11/02; B21D 39/00
(52) U.S. Cl. ........................................ 92/169.3; 29/523
(58) Field of Search ............................ 92/169.2, 169.3; 91/376 R; 29/505, 522.1, 523

(56) References Cited

U.S. PATENT DOCUMENTS 5,487,327 A * 1/1996 Schluter et al. ................ 92/128
6,406,237 B1 * 6/2002 Wojciechowski et al. ..... 29/523

* cited by examiner

Primary Examiner—Edward K. Look
Assistant Examiner—Michael Leslie
(74) Attorney, Agent, or Firm—Scott A. McBain

(57) ABSTRACT

The present invention relates to a system and a process for assembling a tube in a connecting element, and a housing for a braking assistance servomotor, in a device for controlling braking including such a system. The system for assembling a tube (10) with a female connecting element (11) comprising a longitudinal bore (14) provided with a transversal shoulder (14a), system in which a hollow end portion (18) of the tube is inserted in the said bore in abutment against its shoulder, is characterized by the fact that the longitudinal wall of the said end portion comprises a zone (23) deformed by compression between the said shoulder and the remainder of the tube and deformed transversally within the internal wall of the bore to provide mechanical connection and tightness between the tube and the connecting element.

14 Claims, 3 Drawing Sheets

SYSTEM AND PROCESS FOR ASSEMBLING A TUBE IN A CONNECTING ELEMENT, AND SERVOMOTOR HOUSING INCLUDING SUCH A SYSTEM

TECHNICAL FIELD

The present invention relates to a system for assembling a tube in a connecting element, a process for assembling a tube in a connecting element and a housing for a braking assistance servomotor in a braking control device including such a system.

BACKGROUND OF THE INVENTION

Braking devices in motor vehicles conventionally comprise an assistance servomotor permitting the generation of an operating pressure in a master-cylinder without making an operator working the brake pedal bear the whole of the necessary thrust effort. The servomotor comprises a rigid casing or housing separated in tight manner into two chambers by a mobile partition, the said partition being firmly attached to a composite piston placed between the master-cylinder and an operating rod connected to the brake pedal and controlling the opening of a valve to vary the pressure in the chambers. The housing of the servomotor, generally formed of a front casing and a back casing is assembled in tight manner with the master-cylinder and the whole is assembled by the said housing to a vertical wall of the motor vehicle.

When the operator operates the brake pedal, the housing is subjected to high pressures and to a large reaction force, proportional to the force obtained at the outlet of the master-cylinder. To avoid the housing becoming deformed or detaching from the vertical wall of the vehicle, a first technology consists of using housings made of thick sheet metal. A second technology consists of providing the housing with tie rods or reinforcement elements, attached by their ends to the bottoms of the front and back casings, which are opposite each other, by means of connecting pieces. Each reinforcement element can consist of a solid or hollow tube. In the latter case, assembly of the master-cylinder and the housing can be effected by means of fixing screws passing in the hollow tubes. One of the ends of the tube comprises for example a thread and is screwed onto a so-called back fixing piece crimped around a fixing hole of the back casing. The other end of the tube is inserted in a bore in a so-called front fixing piece, also crimped around a fixing hole in the front casing, the said end being in abutment against a shoulder in the said bore.

To provide for assembly and tightness between the tube and the front fixing piece, U.S. Pat. No. 5,487,327 proposes, as shown diagrammatically in FIG. 1A, to simultaneously crimp the fixing piece 200 onto the front casing 201 and the tube 202 onto the fixing piece by providing a knurling 203 on the end of the tube inserted in the bore 204 provided with a shoulder 205. In a modified embodiment, the crimping of the tube is obtained or finished by flattening down a collar of the connecting piece in an annular groove present on the outer surface of the tube. This assembly system involves a crimping operation using large forces which require solid tubes. Moreover, this crimping operation must be carried out in a very precise manner to avoid damaging the tube.

With reference to FIG. 1B, international application WO 99/41122 describes another assembly system in which the tightness between the tube 206 and the fixing element 207 is obtained by the presence of an O-ring seal 208 placed in an annular groove 209 in the bore 210. This assembly system requires the presence of an additional piece.

SUMMARY OF THE INVENTION

The aim of the present invention is to propose an alternative to the two assembly systems described above, which is simple to produce.

The invention proposes a system for assembly of a tube with a female connecting element comprising a longitudinal bore provided with a transversal shoulder, in which system a hollow end portion of the tube is inserted into the said bore in abutment against its shoulder, characterised by the fact that the longitudinal wall of the said end portion comprises a zone deformed by compression between the said shoulder and the remainder of the tube and transversally deformed within the internal wall of the bore to ensure mechanical connection and tightness between the tube and the connecting element.

In accordance with one characteristic, the longitudinal wall of the end portion comprises a zone of lesser thickness.

Advantageously, the longitudinal wall of lesser thickness extends from the free end of the end portion to a transversal shoulder present inside the tube.

In accordance with another characteristic, the bore passes right through and includes two cylindrical portions separated by its shoulder, a first portion having a small cross-section smaller than the external cross-section of the tube and a second portion having a large cross-section substantially equal to or greater than the external cross-section of the tube, so that the hollow end portion of the tube is inserted in the second portion.

Advantageously, the tube is hollow through the whole of its length.

In accordance with another characteristic, the second portion has a length greater than that of the said end portion, so that the deformed zone of the end portion is closer to the shoulder in the bore than the free end of the second portion.

In accordance with a modified embodiment, the second portion has, in the vicinity of its shoulder, an annular groove extending transversally outwardly to at least partially receive the deformed zone.

In accordance with another modification, the longitudinal wall of the second portion of the bore includes knurling at least at the level of the deformed zone of the tube.

A further aim of the present invention is to propose a process for assembling a tube with a female connecting element.

The process for assembling a tube with a female connecting element comprising a bore provided with a shoulder is characterised by the fact that it comprises:

the introduction into the said bore of an end portion of the tube, the said tube being hollow along the said end portion, the said hollow end portion forming or comprising a zone of weakness having a lesser resistance to compression than the remainder of the tube, until the free end of the end portion abuts against the said shoulder, and the application of a compression force to the said tube, substantially along the bore axis, greater than the resistance to compression of the said zone of weakness, so as to deform the latter transversally outwardly and form a deformed zoned ensuring mechanical connection and tightness between the tube and the connecting element.

In accordance with one characteristic, the process comprises the introduction into the said bore of an end portion of the tube, the zone of weakness of which consists of a thinner zone of lesser thickness than the remainder of the tube, formed by a reduction of thickness inside the end portion.

In accordance with another characteristic, the thinner zone extends over a determined length from the free end of the end portion.

In accordance with a modification, the process consists of applying a compression force until the zone of weakness is deformed and at least partially pressed back into an annular groove in the bore extending transversally in the vicinity of the shoulder.

A further aim of the present invention is to propose an hermetic housing for a braking assistance servomotor including such a system.

The hermetic housing in accordance with the invention including two casings, reinforcement elements formed of tubes assembled by their ends, by means of connecting elements, with opposed walls of the casings, is characterised by the fact that the tubes are assembled with the connecting elements in accordance with the assembly system defined above.

Advantageously, the hermetic housing comprises connecting rods inserted through the connecting elements and tubes and intended to permit assembly of the breaking device with a wall of the vehicle for which the braking device is intended.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1A:
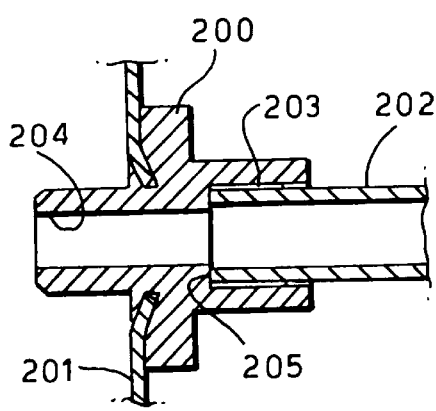
FIGS. 1A and 1B are partial sectional views diagrammatically illustrating two embodiments of a system for attachment of a tube to a connecting piece in accordance with the prior art.
Figure 1B:
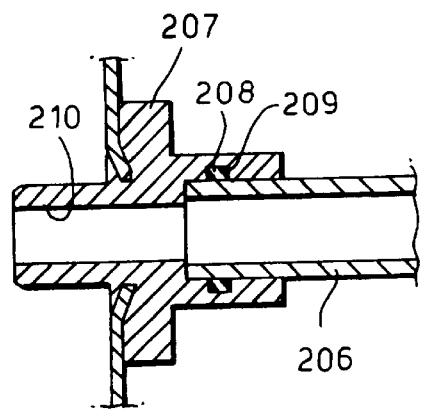
Figure 2:
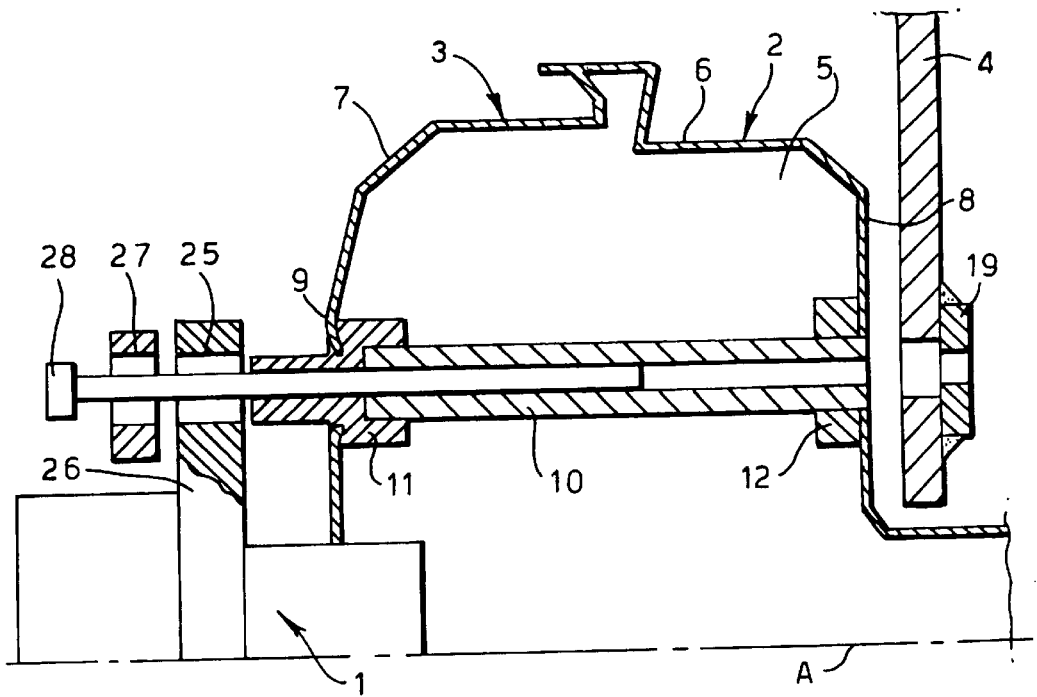
FIG. 2 is a partial sectional view diagrammatically illustrating a braking device comprising a servomotor which includes an assembly system in accordance with the invention.

In the following description, the assembly system in accordance with the invention is applied to a servomotor for assistance of a pneumatic or vacuum braking device. As shown in FIG. 2, the braking device comprises a master-cylinder 1 and a servomotor 2 associated with a control valve (not shown). The servomotor comprises a housing 3 which is substantially symmetrical about the main axis A of the master-cylinder 1, the said axis being for example arranged substantially horizontally, as shown in FIG. 2, when the device is fixed to a vertical wall of the motor vehicle. In known manner, the servomotor comprises a mobile partition (not shown) separating the internal volume 5 of the housing into two chambers.

The housing is formed of two casings, a so-called back casing 6 by which the housing is fixed to the said vertical wall 4 and a so-called front casing 7, the two casings being assembled in tight manner. The casings each comprise a bottom wall 8, 9 arranged substantially perpendicularly to the axis A. Reinforcement elements formed by hollow tubes 10 extending in the internal space 5 are assembled by their ends with the bottom walls 8, 9. The housing comprises for example two hollow tubes 10 arranged symmetrically relative to the axis A and parallel with this. Of course, the hollow tubes pass tightly through the mobile partition (not shown). Assembly of each tube is performed by means of a front connecting element 11 and a back connecting element 12, which are respectively assembled in tight manner with the front bottom wall 9 and the back bottom wall 8. The assembly between a tube and a front connecting element, shown diagrammatically in FIG. 2, is based on the insertion of an end portion of the tube in a bore passing through the connecting element provided with a shoulder.

This assembly will now be described in more detail with reference to FIGS. 3 and 4. The front connecting element 11 is hermetically crimped around a hole passing through the bottom wall 9 of the front casing. It is formed of a cylindrical body 13 comprising a coaxial bore 14, passing through the said body from one side to the other, and a radial collar 15 coming against the internal surface 9a of the bottom wall 9 when it is crimped onto the bottom wall, so that the cylindrical body comprises a back part 16 remaining within the housing 3 and an external front part 17 arranged outside the housing. The crimping is effected by turning back of material of the external part of the cylinder against the external surface of the wall. The external diameter of the back part can be greater than that of the front part. As shown in FIG. 2, the connecting element can also be formed of a cylindrical body comprising an external transversal shoulder defining the back part and the front part, the said shoulder coming against the internal surface of the bottom wall on crimping. The bore 14 comprises a transversal shoulder 14a oriented towards the inside of the housing and arranged substantially perpendicularly to the axis of the bore. This shoulder defines two cylindrical portions, a first portion 14b opening outside the housing and having a small section smaller that the external section of the tube, and a second portion 14c intended to receive the end portion of the tube, opening inside the housing and having a large section substantially equal to or greater than the external section of the tube.

Figure 3:
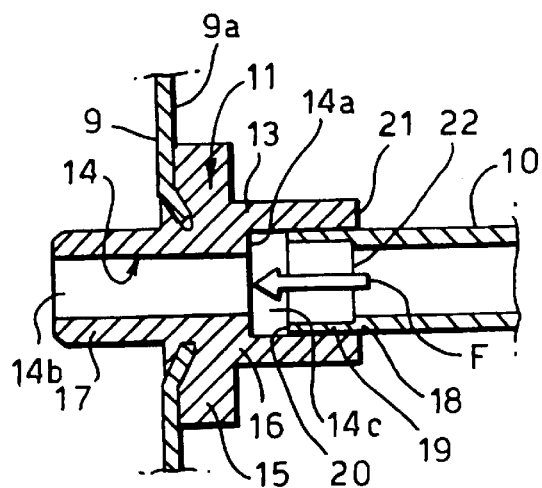
FIG. 3 is a partial sectional view illustrating the step of introducing a tube into a connecting element to obtain an assembly system in accordance with the invention.
Figure 4:
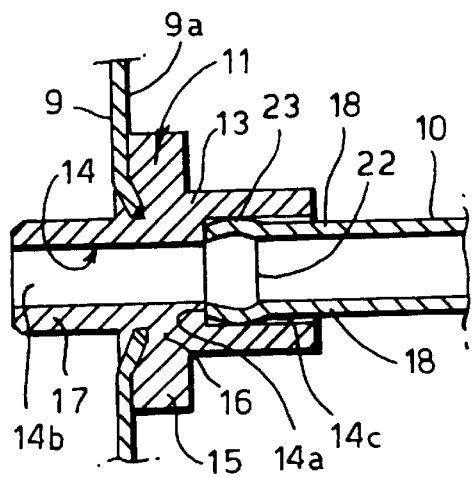
FIG. 4 is a partial sectional view of a system for assembling a tube in a connecting element in accordance with the invention.

As shown in FIG. 3, assembly is obtained by means of a tube 10 which has a lesser thickness at the level of its end portion 18 intended to be inserted in the second portion of the bore, defining a thinner zone 19. This thinner zone is obtained by a reduction of thickness or thinning inside the tube, so that the external diameter of the tube 10 remains substantially constant over its whole length. The internal wall of the tube therefore has a transversal shoulder 22 which delimits the thinner zone 19 from the remainder of the tube, the said shoulder being substantially perpendicular to the axis of the tube. The thinner zone 19 extends from the longitudinal edge or free end 20 of the end portion of the tube for a determined length, which is less than the length of the second portion of the bore which corresponds to the distance between the shoulder 14a and the free end 21 of the said portion. This thinner zone 19, which forms a zone of weakness, has a lesser resistance to compression than the remainder of the tube. The end portion 18 of the tube is inserted into the second portion 14c of the bore 14, as shown by the arrow marked F, and a compression force is applied to the tube, preferably substantially along the axis of the bore. This compression force can be applied from the start of the insertion of the tube into the bore or only once the tube is in abutment against the shoulder. It is greater than the compression resistance of the thinner zone and less than that of the remainder of the tube. When the end portion 18 comes into abutment with its free end 20 against the shoulder, the thinner zone is deformed transversally outwardly under the influence of the compression force to form a deformed zone 23 (FIG. 4). The deformed zone 23 obtains a retention force between the tube 10 and the front connecting element 11 and also provides tightness between these two elements. The retention force between the tube and the connecting element must be sufficient to permit manipulation of the assembly on assembly of the housing. It permits resistance to traction efforts greater than 1500 N.

The thinner zone 19 has a thickness less than the thickness of the remainder of the tube, for example a thickness corresponding to 30 to 50% of the thickness of the remainder of the tube. By way of example, for a tube of the order of 2 millimeters nominal thickness and having an internal diameter of between 8.8 and 9.2 millimeters, the tube includes a thinner zone of 0.8 millimeters thickness. Depending on the thickness of the tube and the nature of the tube, for example metal, the compression force applied to the tube to effect assembly is between 17000 and 23000 N.

As shown in FIG. 2, assembly of the other end of the tube 10 with the back casing 6 can be effected by means of a back connecting piece consisting of a nut 12, crimped tightly against the inner surface of the bottom wall 8 of the back casing, around a hole passing through the said bottom wall. The end of the tube has a thread and is screwed into the nut 12. The tightness of this assembly can be provided in known manner by a sealing adhesive. By way of example, the threaded end of the tube is covered in non-adhering microcapsules containing an adhesive which is liberated on the screwing step and which dries in 2–3 hours.

The assembly of the master-cylinder 1 with the servomotor 2 is obtained by inserting the external front parts 17 of the connecting elements into holes 25 of a fixing clamp 26 of the master-cylinder 2 and by then tightening nuts 27 on these front parts which are threaded. In the case of hollow tubes 10, assembly of the braking device can be effected by connecting rods 28 formed for example of screws, passing through the bores 14 in the front connecting elements and the hollow tubes, and screwed to the vertical wall 4 of the vehicle, for example in nuts 29 welded to this vertical wall 4.

In a modified embodiment, the second portion of the bore in the front connecting element comprises a knurling against which the thinner zone of the tube is deformed. This knurling enables a better retention force to be obtained between the tube and the connecting element.

Figure 5:
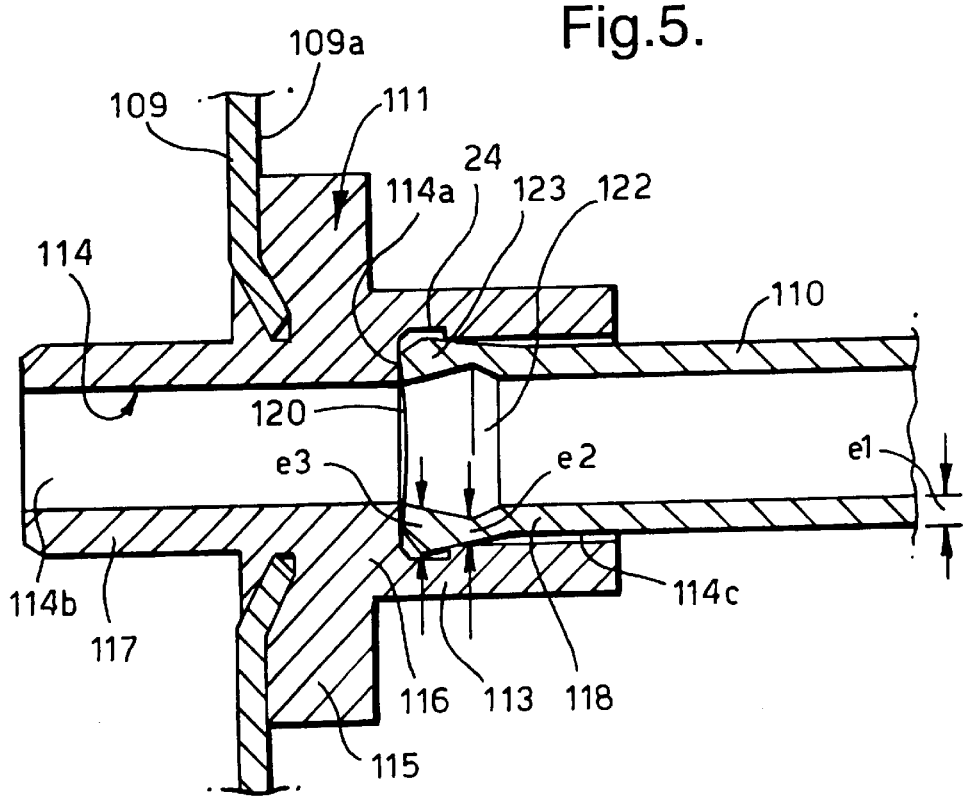
FIG. 5 is a partial sectional view of an assembly system in accordance with a modified embodiment.

FIG. 5 shows another modified embodiment also permitting improvement of the retention force between the tube and the front connecting element. In this FIG. 5, the reference marks of FIGS. 3 and 4 have been used, increased by one hundred, to designate similar elements. The bore 114 comprises a transversal annular groove 24 formed in the extension of the shoulder 114a and the transversally outwardly deformed zone 123 of the end portion 118 of the tube 110 is positioned partially in the said groove 24. This assembly system is obtained from a tube substantially identical to that described above with reference to FIG. 3. The end portion 118 of the tube comprises a thinner zone, of thickness e2 less than the thickness e1 of the remainder of the tube, delimited by an internal shoulder 122, which is for example sloped relative to the axis of the tube. Under a compression force, the said thinner zone is deformed transversally to form a deformed zone of thickness e3 greater than the thickness e1 of the tube, arranged partially in the groove, which provides the mechanical connection and tightness between the tube and the connecting element. The groove allows a better retention force to be obtained between the two elements and also favours the pressing back of material transversally outwardly, in the groove, to avoid the deformed zone forming an obstacle to the insertion of the fixing screw through the connecting element.

Figure 6:
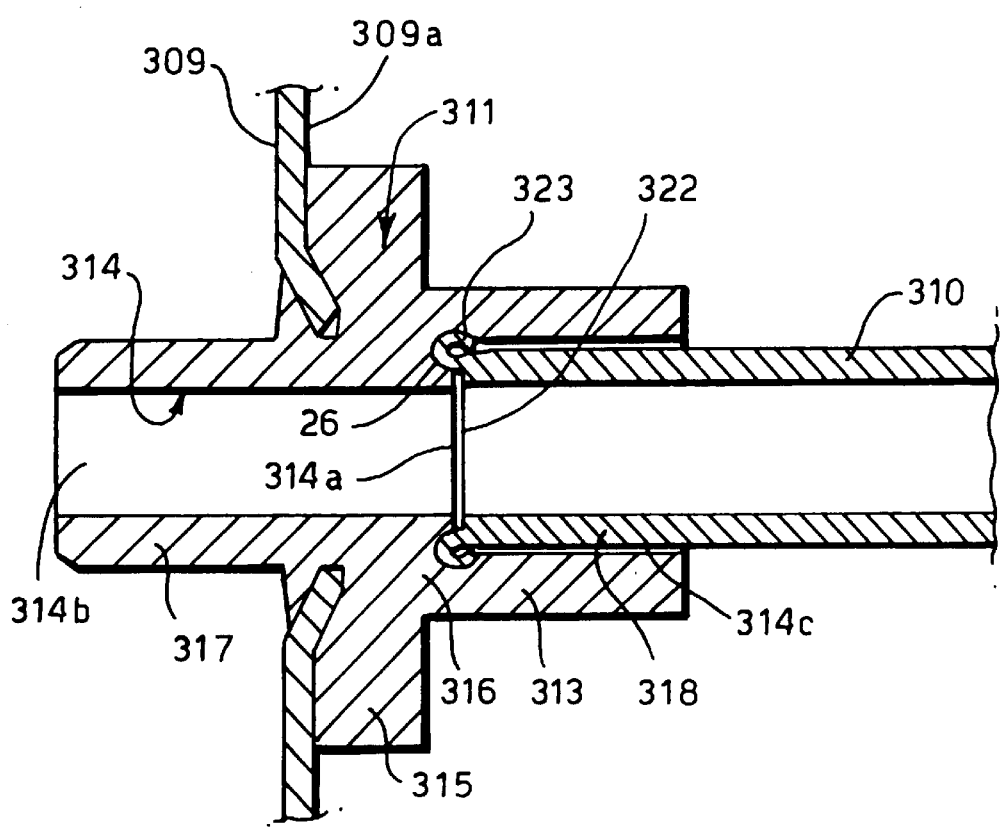
FIG. 6 is a partial sectional view of an assembly system in accordance with a further modified embodiment

FIG. 6 shows a further modified embodiment also permitting improvement of the retention force between the tube and the front connecting element. In this FIG. 6, the reference marks of FIGS. 3 and 4 have been used, increased by three hundred, to designate similar elements. The bore 314 comprises a transversal annular groove 26 formed in the extension of the shoulder 314a. The groove 26 has a curved surface and the transversally outwardly deformed zone 323 of the end portion 318 of the tube 310 is positioned in the said groove 26. This assembly system is obtained from a tube substantially identical to that described above with reference to FIG. 3. The end portion 318 of the tube comprises a thinner zone, of thickness less than the thickness of the remainder of the tube, delimited by an internal shoulder 322. Under a compression force, the said thinner zone is deformed transversally radially outwards to form a deformed zone 323 which is in the shaped of an annular bead, arranged in the groove, which provides the mechanical connection and tightness between the tube and the connecting element. The outer diameter of the bead 323 is greater than diameter of the second portion 314c of the bore 314. The compression force is preferably applied until the traversal shoulder 322 of the tube 310 is substantially adjacent the shoulder 314a of the bore 314. The groove 26 allows a better retention force to be obtained between the two elements and also favours the pressing back of material transversally outwardly, in the groove, to avoid the deformed zone forming an obstacle to the insertion of the fixing screw through the connecting element.

Although the invention has been described in connection with a particular embodiment and three modifications, it is quite obvious that it is in no way limited to them and that it comprises all the technical equivalents of the means described and their combinations if these enter into the framework of the invention.

By way of example, the zone of weakness of the end portion can consist not of a thinning of the thickness of the tube but of a zone in which the material forming the tube has a lesser resistance, obtained by reheating or cold working. The zone of weakness can, moreover, extend not until the free end of the end portion of the tube comes in abutment against the shoulder, but over a part of the end portion upstream of the said free end. Moreover, the tube can be hollow only at the level of its end portion intended to be inserted in the bore, this hollow end portion being able to form the zone of weakness. When the tube is not hollow over its whole length, the connecting element may comprise a blind longitudinal bore, the above-mentioned shoulder in the bore then consisting of the bottom of the bore.

What is claimed is:

1. System for assembly of a tube with a front connecting element comprising a longitudinal bore provided with a bore transversal shoulder, in which system a hollow end portion of the tube is inserted in the said bore in abutment against said shoulder, wherein a longitudinal wall of the said end portion comprises a zone deformed in compression between the said shoulder and the remainder of the tube and transversely deformed within the internal wall of the bore to provide the mechanical connection and tightness between the tube and the front connecting element.

2. Assembly system as described in claim 1, wherein the longitudinal wall of the end portion comprises a thinner zone.

3. Assembly system as described in claim 2, wherein the thinner zone of the longitudinal wall extends from a free end of the end portion to a tube transversal shoulder present inside the tube.

4. Assembly system as described in claim 2, wherein the bore passes right through an includes two cylindrical portions separated by the bore transversal shoulder, a first portion having a small cross-section smaller than the external cross-section of the tube and a second portion have a large cross-section substantially equal to or greater than the external cross-section of the tube, so that the hollow end portion of the tube is inserted in the second portion.

5. Assembly system as described in claim 4, wherein the tube is hollow along its whole length.

6. Assembly system as described in claim 4, wherein the second portion has a length greater than that of the end portion, so that the deformed zone of the end portion is closer to the bore transversal shoulder than the free end of the second portion.

7. Assembly system as described in claim 6, wherein the second portion has in the vicinity of the bore transversal shoulder an annular groove extending transversally outwardly to receive the deformed zone at least partially.

8. Assembly system as described in claim 7, wherein the longitudinal wall of the second portion of the bore includes knurling at least at the level of the deformed zone of the tube.

9. Hermetic housing for assistance servomotor of a braking device, the hermetic housing including two casings, reinforcement elements formed of tubes assembled by their ends, by means of connecting elements, with opposite wall of the casings, comprising the tubes assembled with connecting elements in accordance with the assembly system defined in claim 1.

10. Hermetic housing as described in claim 9, comprising connecting rods inserted through the connecting elements and the tubes to permit assembly of the braking device on a wall of the vehicle of which the braking device is intended.

11. Process for assembling a tube with a front connecting element comprising a bore provided with a shoulder, comprising the introduction into said bore of an end portion of the tube, said tube being hollow along said end portion, the said hollow end portion forming or comprising a zone of weakness having a lesser resistance to compression than the remainder of the tube, until the free end of the end portion comes into abutment against said shoulder, and the application of a compression force to the tube, substantially along the axis of the bore, greater than the resistance to compression of said zone of weakness, so as to deform the tube transversally outwardly and form a deformed zone providing mechanical connection and tightness between the tube and the connecting element.

12. Assembly process as described in claim 11, wherein it comprises the introduction into said bore of an end portion of the tube, the zone of weakness of which is formed by a thinner zone, formed by a reduction in thickness inside the end portion.

13. Assembly process as described in claim 11, wherein the thinner zone extends over a determined length from the free end of the end portion.

14. Assembly process as described in claim 11, wherein it consists of applying a compression force until the zone of weakness is deformed and is at least partially pressed back into an annular groove in the bore extending transversally in the vicinity of the shoulder.

* * * * *